(12) United States Patent
Hensinger et al.

(10) Patent No.: US 11,648,491 B2
(45) Date of Patent: May 16, 2023

(54) FILTER DEVICE

(71) Applicant: Mahle International GmbH, Stuttgart (DE)

(72) Inventors: Heiko Hensinger, Stuttgart (DE); Peter Koppi, Sankt Margarethen (AT); Maria Kraut, St. Michael (AT)

(73) Assignee: Mahle International GmbH

( * ) Notice: Subject to any disclaimer, the term of this patent is extended or adjusted under 35 U.S.C. 154(b) by 230 days.

(21) Appl. No.: 17/070,388

(22) Filed: Oct. 14, 2020

(65) Prior Publication Data

US 2021/0106928 A1 Apr. 15, 2021

(30) Foreign Application Priority Data

Oct. 15, 2019 (DE) .......................... 102019215867.6

(51) Int. Cl.
*B01D 17/04* (2006.01)
*B01D 35/30* (2006.01)
*B01D 29/05* (2006.01)

(52) U.S. Cl.
CPC ........... *B01D 17/045* (2013.01); *B01D 29/05* (2013.01); *B01D 35/306* (2013.01)

(58) Field of Classification Search
CPC .... B01D 17/045; B01D 29/05; B01D 35/306; B01D 29/15; B01D 29/58; B01D 2201/0423; B01D 2201/4046; B01D 36/001; B01D 36/003
USPC ....... 210/256, 261, 252, 315, 337, 338, 342, 210/DIG. 5, 485, 455, 472, 120, 180, 210/493.2, 450
See application file for complete search history.

(56) References Cited

U.S. PATENT DOCUMENTS

| | | |
|---|---|---|
| 2008/0302717 A1 | 12/2008 | Terry et al. |
| 2016/0258397 A1 | 9/2016 | Jiang et al. |
| 2018/0290086 A1* | 10/2018 | Grisham .............. B01D 35/153 |
| 2019/0111371 A1 | 4/2019 | Nimtz |

FOREIGN PATENT DOCUMENTS

| | | |
|---|---|---|
| DE | 10 2008 026 485 A1 | 2/2009 |
| DE | 10 2013 012 917 A1 | 2/2015 |
| DE | 10 2014 011 785 A1 | 6/2015 |
| DE | 10 2014 002 631 A1 | 8/2015 |
| DE | 10 2014 010 997 A1 | 2/2016 |
| DE | 10 2015 003 097 A1 | 9/2016 |

(Continued)

*Primary Examiner* — Madeline Gonzalez
(74) *Attorney, Agent, or Firm* — Fishman Stewart PLLC

(57) ABSTRACT

A filter device is disclosed. The filter device includes a coalesce and a final separator arranged one after another in a flow direction. The final separator includes final separator material and is arranged radially within the coalesce. The coalesce is configured hollow-cylindrical and includes a coalescer material and an external support structure with an upper coalescer ring and a lower coalescer ring that are connected with one another via axial coalescer ribs. A positioning element is provided on the final separator. A positioning opening is provided in a region of the at least one lower coalescer ring. The positioning opening is configured in a complementary manner to the positioning element and the final separator engages into the positioning opening in a mounted state with the positioning element and thereby aligns the final separator relative to the coalesce.

20 Claims, 2 Drawing Sheets

(56) References Cited

FOREIGN PATENT DOCUMENTS

| DE | 10 2015 003 756 A1 | 9/2016 |
| DE | 10 2017 119 926 A1 | 2/2019 |
| DE | 10 2018 125 235 A1 | 4/2019 |
| DE | 10 2018 205 069 A1 | 10/2019 |

* cited by examiner

FILTER DEVICE

CROSS-REFERENCE TO RELATED APPLICATION

This application claims priority to German Application No. DE 10 2019 215 867.6 filed Oct. 15, 2019, the contents of which are hereby incorporated by reference in its entirety.

TECHNICAL FIELD

The present invention relates to a filter device with a coalescer and a final separator arranged one after another in flow direction.

BACKGROUND

From US 2016/0258397 A1 a generic filter device is known with a ring filter element, coalescer and final separator arranged one after another in flow direction.

In order to guarantee a long-term, faultless function of a filter device, care is to be taken that as far as possible the entire filter surface is available for the fluid which is to be filtered. For this reason, filter devices usually have venting devices via which air can be discharged from the filter device. Here, care is also to be taken in particular that in the case of multi-stage filter devices, for example with a ring filter element, a coalescer and a final separator air can also be collected and discharged between the individual stages. Here of course vent openings are to be arranged as much as possible at the site which in the normal operating state of the filter device also lies at a high or respectively highest location, so as not to generate an air cushion, collecting thereabove, through vent openings which are lying too low. For this reason, in particular an installation position of for example a final separator with a vent opening in a coalescer is of crucial importance, because for example in the case of an incorrect installation in which the vent opening of the final separator lies at a location which is too low, air can collect thereabove and the filter surface which is present there can no longer be used for a filtration or respectively a separation.

The present invention is therefore concerned with the problem of indicating for a filter device of the generic type an improved or at least an alternative embodiment, which in particular guarantees an easy mounting of a filter device and a reliable venting thereof.

This problem is solved according to the invention by the subject of the independent claim(s). Advantageous embodiments are the subject of the dependent claims.

SUMMARY

The present invention is based on the general idea of providing between a coalescer and a final separator of a filter device a Poka-Yoke system, which permits exclusively a single predefined installation position of the final separator in the coalescer, wherein in this permitted installation position the final separator is aligned to the coalescer in such a way that a reliable function of the filter device is guaranteed, in particular also with regard to a supporting of a coalescer material and/or a venting. For this, the filter device according to the invention has a coalescer and a final separator arranged one after another in flow direction, wherein the final separator is arranged radially within the coalescer. The coalescer is configured to be hollow-cylindrical and has a coalescer material and an external supporting structure with at least one upper and one lower coalescer ring, which are connected with one another via axial coalescer ribs. A positioning element is provided on the final separator, in particular on a lower final separator ring, wherein in the region of the lower coalescer ring, in particular on the lower coalescer ring, a positioning opening is provided which is configured in a complementary manner to the positioning element of the final separator, into which the final separator engages in the mounted state with its positioning element, and thereby aligns the final separator relative to the coalescer. The positioning element at the final separator side and the positioning opening at the coalescer ring side form here the previously described Poka-Yoke system, which enables exclusively a single predefined relative position of the final separator to the coalescer in the installed state. This Poka-Yoke system facilitates a mounting, in particular also for inexperienced workers, and in addition ensures a high manufacturing quality, because an incorrect assembly can be reliably ruled out by means of the Poka-Yoke system. The Poka-Yoke system can be used here in order for example to position a vent opening on the final separator so that the latter, in the installed state, lies with respect to a horizontal above a final separator material, so that the entire final separator material is available for the separation and is not reduced by an air cushion which is present under certain circumstances. The Poka-Yoke system can also be used additionally or alternatively to position final separator ribs of the final separator so that via these a coalescer material of the coalescer is supported. In both cases, a reliable function of the filter device can therefore be guaranteed in the long term and easily.

In an advantageous further development of the solution according to the invention, the final separator is configured to be angular in cross-section and has between respectively two adjacent final separator ribs a final separator material which is tensioned flat. Such a final separator can be, for example, hexagonal or octagonal in cross-section. Through the final separator ribs, a coalescer material which is arranged radially thereto and is external can be supported, whereby an abutting of the coalescer material against the final separator material can be reliably prevented and thereby a distinctly improved filter performance can be achieved. The coalescer can be configured for example to be round in cross-section, wherein in this case with a mounted filter device at least one of the final separator ribs lies in circumferential direction between two coalescer ribs and thereby enables a supporting of the coalescer material. Through the preventing of the abutting of the coalescer material against the final separator material, in particular an increased water separation rate can be achieved, which for example is particularly advantageous in the case of a filter device which is designed as a fuel filter.

Expediently, an insertion funnel for the final separator, projecting into an interior, is arranged at the lower coalescer ring of the coalescer. By means of such an insertion funnel an installation of the final separator into the coalescer can be simplified, because the insertion funnel forms a positive guidance for the final separator and the latter is thereby prevented from tilting.

Expediently, the insertion funnel has spokes running obliquely to a filter axis, which are attached at least partially at one end to the lower coalescer ring and at the other end are connected with one another via an inner ring. By the spokes, a permeability of the insertion funnel for fluid can be achieved without a problem, in addition less material is used, whereby a conservation of resources can be achieved. Through the spoke solution, in addition the weight can be reduced.

Expediently, one of the spokes in the region of the positioning opening is not connected with the lower coalescer ring, but rather is connected with two adjacent spokes via a circle segment arc, wherein in this case the positioning opening is provided between the lower coalescer ring and the circle segment arc. The positioning opening is therefore integrated into the insertion funnel, whereby its production, for example in a plastic injection moulding method, is possible in a simple manner.

In an advantageous further development of the solution according to the invention, the support structure of the coalescer and the insertion funnel together with spokes and inner ring are formed as a plastic injection moulded part, in particular as a one-piece plastic injection moulded part. Hereby, not only a favourably priced, but at the same time also a high-quality manufacture can be achieved.

In a further advantageous embodiment of the solution according to the invention, the final separator ribs are arranged on an outer diameter of the final separator and have at their lower end in the installation state a chamfer which is formed in a complementary manner to the spokes, so that the final separator in the installed state rests with the chamfers against the final separator ribs on the spokes. Through the complementary formation of the chamfers of the final separator ribs and of the oblique position of the spokes of the insertion funnel, a further improved guidance of the final separator on installation into the coalescer and thereby a simplified installing can be achieved. At the same time, through in particular a linear or planar abutting of the chamfers against the spokes, a form-fitting connection can also be achieved between the final separator and the coalescer.

In a further advantageous embodiment of the solution according to the invention, the final separator has on an upper final separator ring in the installed state an outwardly open, annular vent groove with a radial vent opening, wherein the vent opening in the installed state lies above a final separator material with respect to a horizontal. The positioning element on the final separator side, for example a blade, is arranged here relative to the vent opening in the vent groove in such a way that with an engaging of the positioning element into the positioning opening on the coalescer side, the vent opening of the annular vent groove already lies at a highest possible, or at the highest location, whereby a reliable venting can be guaranteed. Through the reliable venting, in particular the formation of an air cushion between the final separator material and the coalescer material and thereby a reducing of a fluid-permeable filter surface can be prevented, whereby the filter function of the filter device according to the invention can be kept at a high level in the long term.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
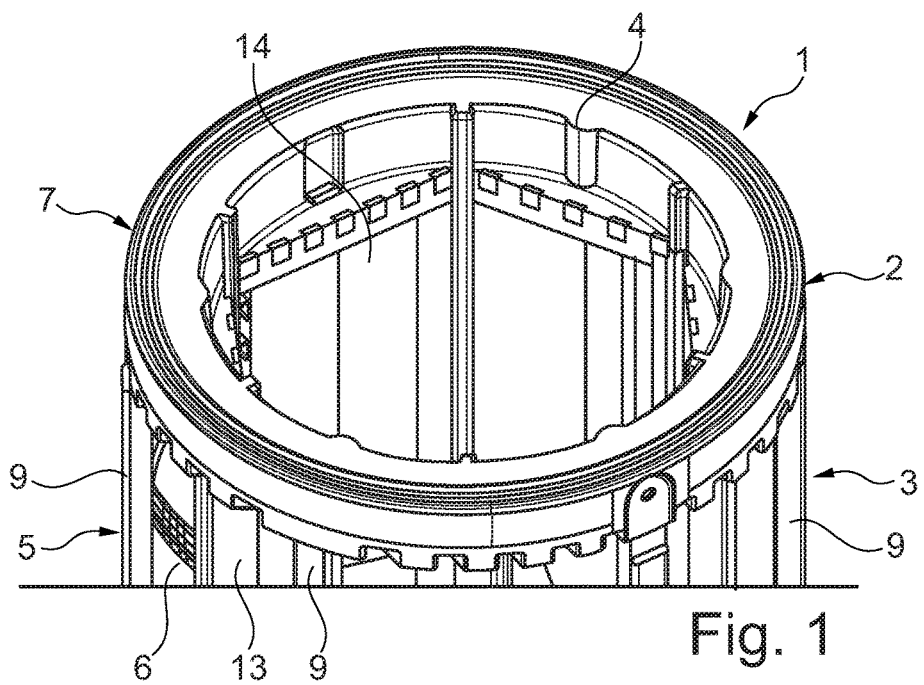
FIG. 1 a filter device according to the invention, with a coalescer and with a final separator arranged therein, FIG. 2 a side view onto the final separator in an installed position, FIG. 3 a lower region of the coalescer, FIG. 4 a top view onto FIG. 3.

According to FIG. 1, a filter device 1 according to the invention, which can be designed for example as a fuel filter, as a hydraulic filter or as an oil filter, has a coalescer 2 and a final separator 4 arranged thereafter in flow direction 3, wherein the final separator 4 is arranged radially within the coalescer 2. The coalescer 2 is configured here to be hollow-cylindrical (cf. also FIGS. 3 and 4) and has an external support structure 5 and a coalescer material 6, which is indicated in FIGS. 1 and 3. Such a coalescer material 6 is to enlarge, i.e. coalesce, water droplets which are carried along in the fluid which is to be filtered, which are then discharged downwards due to gravity. The support structure 5 of the coalescer 2 has an upper coalescer ring 7 and a lower coalescer ring 8, which are connected with one another via axial coalescer ribs 9. On the final separator 4 a positioning element 10 is provided (cf. FIG. 2), which is designed for example as a positioning blade. In the region of the lower coalescer ring 8 a positioning opening 11 (cf. FIGS. 3 and 4), formed in a complementary manner to the positioning element 10, is arranged, wherein this positioning element 11 can of course also be arranged in the region of the lower coalescer ring 8 and not directly on the latter. The final separator 10 engages with its positioning element 10 into this positioning opening 11 in mounted state in the filter device 1, and thereby aligns the final separator 4 relative to the coalescer 2, in particular with regard to a rotation angle position about a filter axis 12. Outside the filter device 1 of course a ring filter element can also be arranged.

With the positioning element 10 according to the invention and the positioning opening 11 on the coalescer side a so-called Poka-Yoke system can be created, which enables exclusively one single installation position of the final separator 4 in the coalescer 2, wherein in this installation position for example final separator ribs 13 lie between two adjacent coalescer ribs 9 and thereby reliably support the coalescer material 6 and in particular prevent an abutting against a final separator material 14, whereby the filter function and in particular also a coalescence function or respectively a separation function can be kept at a high level in the long term. At the same time, the Poka-Yoke system formed by the positioning opening 11 and the associated positioning element 10 enables the possibility of arranging the final separator 4 in such a way in the coalescer 2 that a vent opening 15 (cf. FIG. 2), with the final separator 4 installed in the coalescer 2, lies above the final separator material 14 with respect to a horizontal 16, whereby air accumulating between the coalescer material 6 and the final separator material 14 can be discharged via the vent opening 15 and thereby an air cushion, reducing the filter- or respectively separation function, between the coalescer material 6 and the final separator material 14 can be prevented.

Through the positioning element 10 and the associated positioning opening 11 on the coalescer side therefore a high filter- and separation effect can be maintained in the long term.

Observing the final separator 4 more closely, it can be seen that it is configured to be angular in cross-section, hexagonal in the present case, wherein between respectively two adjacent final separator ribs 13 the final separator material 14 is tensioned flat. Hereby, between the final separator material 14 and the coalescer material 6 an enlarged distance is created, which in particular reduces an abutting of the coalescer material 6 against the final separator material 14 and thereby a reduction of the coalescing or respectively separating effect.

Observing the coalescer 2 further, it can be seen that the latter is configured to be round in cross-section, wherein with a mounted filter device 1 at least one of the final separator ribs 9 lies in circumferential direction between two coalescer ribs 13 and thereby the coalescer material 6 is supported by the final separator ribs 13. Through the supporting effect of the end separator rib 13 between two adjacent coalescer ribs 9, an abutting of the coalescer material 6 against the final separator material 14 can also be reliably prevented, which also contributes to maintaining the coalescing effect of the coalescer material 6 or respectively the separating effect of the final separator material 14 in the long term.

Figure 3:
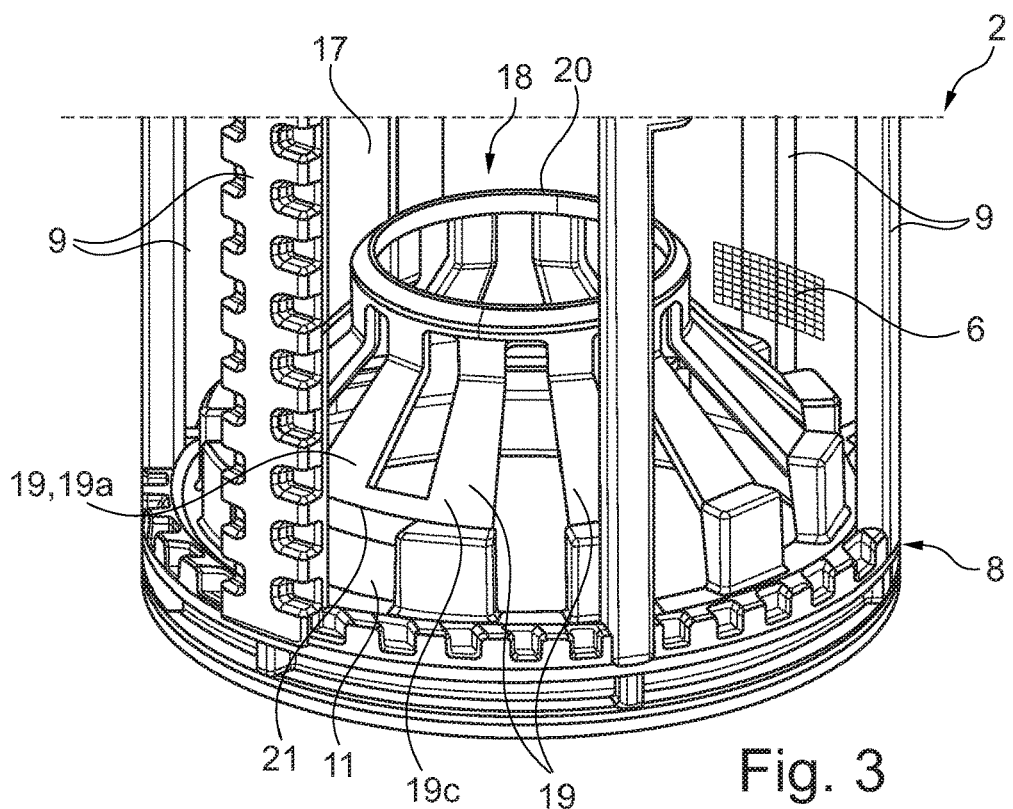
Figure 4:
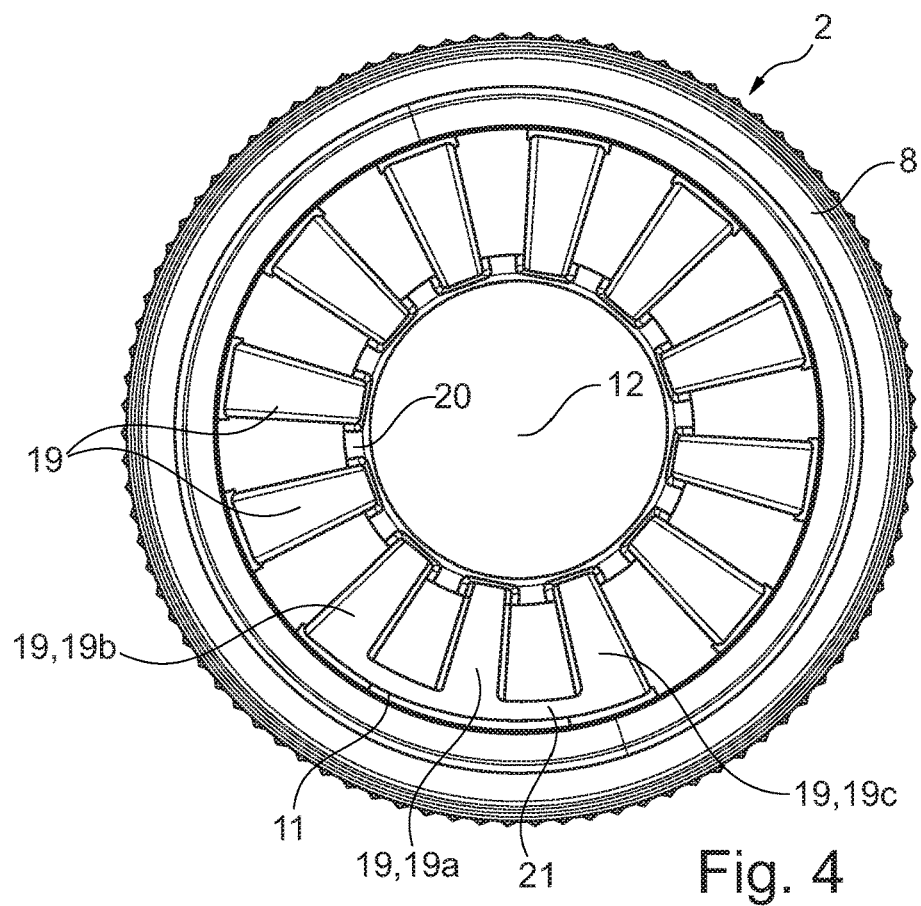

Observing FIGS. 3 and 4, it can be seen that an insertion funnel 18, projecting into an interior 17, for the final separator 4 is arranged on the lower coalescer ring 8 of the coalescer 2. This insertion funnel 18 has spokes 19 running obliquely to the filter axis 12, which are attached at least partially at one end on the lower coalescer ring 8 and at the other end are connected with one another via an inner ring 20. Through the spokes 19, in particular a permeability of the insertion funnel 18 for fluid can be guaranteed. In addition, less material is used, whereby a conservation of resources and, at the same time, a weight reduction, can be achieved.

A spoke 19, according to FIGS. 3 and 4 the spoke 19a, in the region of the positioning opening 11 is not connected with the lower coalescer ring 8, but rather via a circle segment arc 21 with two adjacent spokes 19, here the spokes 19b and 19c (cf. FIG. 4), whereby between the lower coalescer ring 8 and the circle segment arc 21, the ring segment-like positioning opening 11 is formed. In order to be able to engage here in a form-fitting manner into the ring segment-shaped positioning opening 11, the associated positioning element 10 on the final separator side is also configured in a circular ring segment-shaped manner.

In order to be able to form the support structure 5 and the insertion funnel 18 together with spokes 19 and inner ring 20 in a favourably priced and, at the same time, high-quality manner, these are preferably formed as a plastic injection moulded part, in particular as a one-piece plastic injection moulded part.

Figure 2:
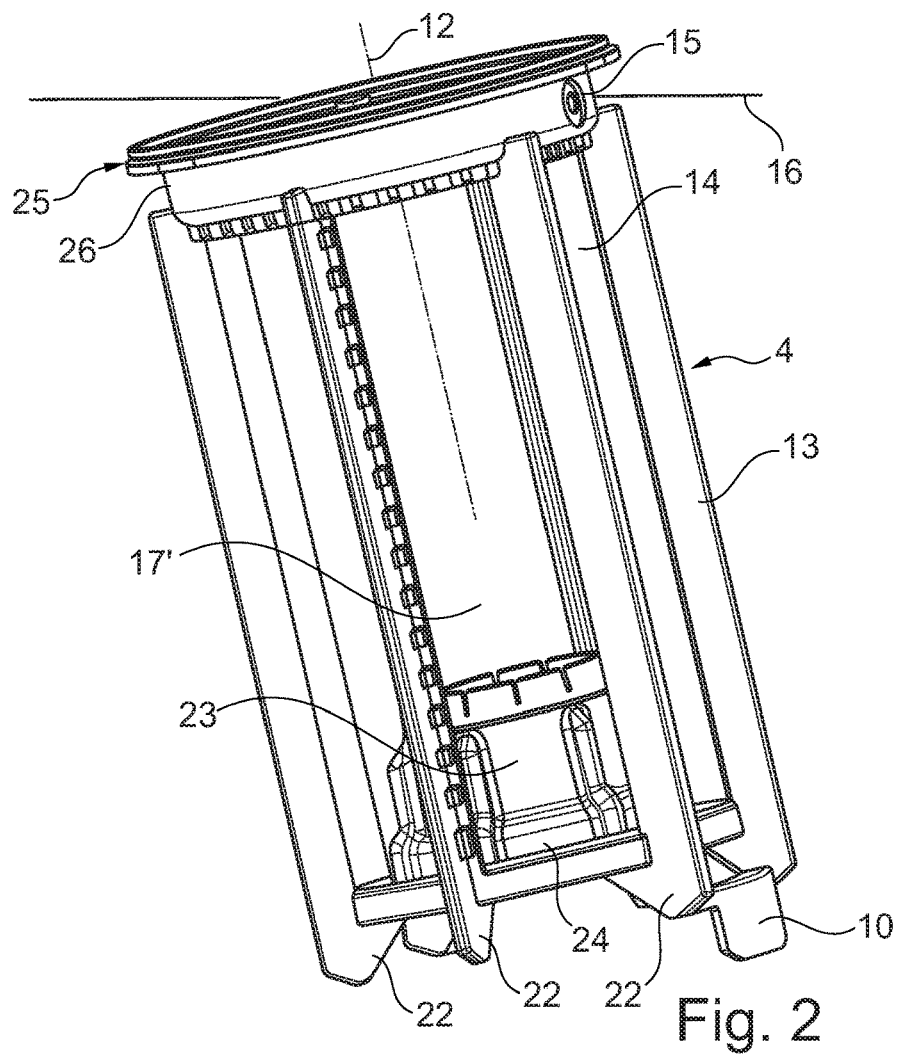

Observing the final separator 4 according to FIG. 2, it can be seen that the final separator ribs 13 are arranged on an outer diameter of the final separator 4 and have at their lower end in the installed state a chamfer 22 which is formed in a complementary manner to the spokes 19, so that the final separator 4 in the installed state rests with the chamfers 22 against the final separator ribs 13 on the spokes 19 and thereby a form-fitting connection can be achieved between the final separator 4 on the one hand and the coalescer 2 on the other hand. Of course, in the final separator 4 in addition an extension 23 can also be provided projecting into its interior 17', which extension for example has at a lower region 24 a shape which is complementary to the inner ring 20 of the insertion funnel 18 and thereby can be pushed onto it in a precisely fitting manner. Hereby, a comparatively simple and, at the same time, highly accurate alignment of the final separator 4 relative to the coalescer 2 can be achieved.

Observing once again FIG. 2, it can be seen that the final separator 4 has on an upper final separator ring 25 in the installed state an outwardly open, ring-shaped vent groove 26, with the radial vent opening 15, which in the installed state lies above the final separator material 14 with respect to the horizontal 16. Via the vent groove 26, which is continuous in a ring-shaped manner, air accumulating between the coalescer material 6 and the final separator material 14 can therefore be directed in a problem-free manner to the vent opening 15 and can be discharged via the latter, so that the entire surface of the final separator material 14 and of the coalescer material 6 is also available for the coalescing or respectively separating effect in the long term.

With the filter device 1 according to the invention therefore a high filter effect can be achieved comparatively simply in the long term, because through the positioning element 10 on the final separator side, forming a Poka-Yoke system, and the positioning opening 11 on the coalescer side, a predefined relative position of the final separator 4 to the coalescer 2 is compelled in the installed state, in which both the vent opening 15 is arranged at a high, in particular at the highest, location and, at the same time, the final separator ribs 13 are positioned to the coalescer ribs 9 so that these are arranged in circumferential direction between these and can support the coalescer material 6.

The invention claimed is:

1. A filter device, comprising:
   a coalescer and a final separator with a final separator material arranged one after another in a flow direction, wherein the final separator is arranged radially within the coalescer,
   the coalescer configured hollow-cylindrical and includes a coalescer material and an external support structure with at least one upper coalescer ring and at least one lower coalescer ring that are connected with one another via axial coalescer ribs arranged on an outer diameter of the coalescer material and defining axially extending openings disposed circumferentially between two adjacent axial coalescer ribs,
   a positioning element provided on the final separator,
   wherein, in a region of the at least one lower coalescer ring, a positioning opening is provided that is configured in a complementary manner to the positioning element and into which the final separator engages in a mounted state with the positioning element and thereby aligns the final separator relative to the coalescer.

2. The filter device according to claim 1, wherein the final separator is configured angular in cross-section and the final separator material is tensioned flat between respectively two adjacent final separator ribs.

3. The filter device according to claim 2, wherein the coalescer is configured round in cross-section, wherein at least one of the two final separator ribs lies in a circumferential direction between two of the coalescer ribs and thereby provides a supporting of the coalescer material.

4. The filter device according to claim 1, further comprising an insertion funnel for the final separator, projecting axially inwards into an interior of the final separator, and arranged at the at least one lower coalescer ring of the coalescer.

5. The filter device according to claim 4, wherein the insertion funnel has a plurality of spokes running obliquely to a filter axis, the plurality of spokes attached at least partially at one end to the at least one lower coalescer ring and at the other end connected with one another via an inner ring.

6. The filter device according to claim 5, wherein the external support structure and the insertion funnel together with the plurality of spokes and the inner ring are formed as a plastic injection moulded part.

7. The filter device according to claim 5, wherein a respective spoke of the plurality of spokes disposed in a region of the positioning opening is not connected with the at least one lower coalescer ring, but rather is connected with two adjacent spokes of the plurality of spokes via a circle segment arc.

8. The filter device according to claim 7, wherein the positioning opening is provided between the at least one lower coalescer ring and the circle segment arc.

9. The filter device according to claim 2, wherein the two final separator ribs are arranged on an outer diameter of the final separator and have at their lower end in an installation state a chamfer that is formed in a complementary manner to a plurality of spokes of an insertion funnel arranged on the at least one lower coalescer ring, such that the final separator in the installed state rests with the chamfers against the two final separator ribs on the plurality of spokes.

10. The filter device according to claim 1, wherein the final separator has on an upper final separator ring in an installed state an outwardly open and circumferential vent groove with a vent opening, wherein the vent opening in the installed state lies above the final separator material with respect to a horizontal.

11. The filter device according to claim 1, wherein the positioning opening is provided on the at least one lower coalescer ring.

12. The filter device according to claim 1, wherein the positioning element comprises a positioning blade.

13. A filter device, comprising:
a coalescer and a final separator arranged one after another in a flow direction, wherein the final separator has a final separator material and is arranged radially within the coalescer;
the coalescer configured hollow-cylindrical and includes a coalescer material and an external support structure with an upper coalescer ring and a lower coalescer ring that are connected with one another via axial coalescer ribs;
an insertion funnel for the final separator arranged at the lower coalescer ring of the coalescer and projecting axially inwards into an interior of the final separator;
a positioning element provided on the final separator;
wherein a positioning opening is provided on the lower coalescer ring in a complementary manner to the positioning element, and wherein the final separator engages with the positioning element into the positioning opening in a mounted state and thereby aligns the final separator relative to the coalescer.

14. The filter device according to claim 13, wherein the final separator is angular in cross-section and the final separator material is tensioned flat between final separator ribs.

15. The filter device according to claim 14, wherein the coalescer is round in cross-section, and wherein at least one of the final separator ribs lies in a circumferential direction between two of the coalescer ribs to facilitate supporting the coaleser material.

16. The filter device according to claim 13, wherein the insertion funnel has a plurality of spokes running obliquely to filter axis that permit a through-flow of fluid radially through the insertion funnel, wherein the plurality of spokes are attached at least partially at one end to the lower coalescer ring and at the other end are connected with one another via an inner ring disposed in the interior of the final separator axially inwards of the lower coalescer ring.

17. The filter device according to claim 16, wherein a respective one of the plurality of spokes in a region of the positioning opening is not connected with the lower coalescer ring, but is rather connected with two adjacent spokes of the plurality of spokes via a circular segment arc.

18. The filter device according to claim 17, wherein the positioning opening is provided between the lower coalescer ring and the circle segment arc.

19. The filter device according to claim 13, wherein the final separator has an outwardly open and circumferential vent groove on an upper final separator ring in an installed state, wherein the vent groove has a vent opening that lies above the final separator material with respect to a horizontal in the installed state.

20. A filter device, comprising:
a coalescer and a final separator arranged one after another in a flow direction with the final separator arranged radially within the coalescer, the final separator includes a final separator material and a plurality of final separator ribs;
the coalescer configured hollow-cylindrical and includes a coalescer material and an external support structure with at least one upper coalescer ring and at least one lower coalescer ring that are connected with one another via axial coalescer ribs;
an insertion funnel arranged on the at least one lower coalescer ring and including a plurality of spokes running obliquely to a filter axis;
a positioning element provided on the final separator;
wherein, in a region of the at least one lower coalescer ring, a positioning opening is provided that is configured in a complementary manner to the positioning element and into which the final separator engages in a mounted state with the positioning element and thereby aligns the final separator relative to the coalescer;
wherein the plurality of final separator ribs are arranged on an outer diameter of the final separator and have at their lower end in an installation state a chamfer that is formed in a complementary manner to the plurality of spokes, such that the final separator in the installed state rests with the chamfers on the plurality of spokes.

* * * * *